United States Patent
Shinohara et al.

(10) Patent No.: US 9,914,613 B2
(45) Date of Patent: Mar. 13, 2018

(54) MECHANISM FOR DISCHARGING SHEETS IN APPARATUS FOR PROCESSING SHEETS AND APPARATUS FOR READING IMAGES PROVIDED WITH THE MECHANISM

(71) Applicant: NISCA CORPORATION, Minamikoma-gun, Yamanashi-ken (JP)

(72) Inventors: Masaaki Shinohara, Tokyo (JP); Junya Ozawa, Yamanashi-ken (JP); Naoto Takeshita, Yamanashi-ken (JP); Hiroyuki Hirokawa, Yamanashi-ken (JP); Masataka Hamada, Yamanashi-ken (JP)

(73) Assignee: CANON FINETECH NISCA INC., Misato-Shi, Saitama (JP)

( * ) Notice: Subject to any disclaimer, the term of this patent is extended or adjusted under 35 U.S.C. 154(b) by 0 days.

(21) Appl. No.: 14/971,054

(22) Filed: Dec. 16, 2015

(65) Prior Publication Data

US 2016/0185555 A1   Jun. 30, 2016

(30) Foreign Application Priority Data

Dec. 25, 2014   (JP) ................. 2014-262019

(51) Int. Cl.
*B65H 29/68*   (2006.01)
*H04N 1/00*   (2006.01)
(Continued)

(52) U.S. Cl.
CPC ............. *B65H 29/68* (2013.01); *B65H 29/52* (2013.01); *B65H 31/02* (2013.01); *H04N 1/0032* (2013.01); *B65H 2301/4212* (2013.01); *B65H 2402/5152* (2013.01); *B65H 2403/945* (2013.01); *B65H 2404/63* (2013.01); *B65H 2404/693* (2013.01); *B65H 2405/115* (2013.01); *B65H 2405/3321* (2013.01);
(Continued)

(58) Field of Classification Search
CPC ....... B65H 29/68; B65H 31/00; H04N 1/0032
See application file for complete search history.

(56) References Cited

U.S. PATENT DOCUMENTS 5,741,009 A * 4/1998 Kawano ................. B65H 29/22
271/182

FOREIGN PATENT DOCUMENTS

JP   2014022840   *  2/2014

OTHER PUBLICATIONS

Internet English translation of JP 2014-02840.*

* cited by examiner

*Primary Examiner* — Iriana Cruz
(74) *Attorney, Agent, or Firm* — Manabu Kanesaka

(57) ABSTRACT

In a sheet discharge mechanism for enabling a wide range of sheets stored on a sheet discharge tray from a processing section, a brake lever for reducing a velocity of a sheet fed from a sheet discharge outlet is held detachably relative to an attachment frame above the sheet discharge tray, and it is possible to select whether brake action is made corresponding to sheet discharge conditions. A sheet discharge mechanism includes a sheet discharge path having a sheet discharge outlet, a sheet discharge tray disposed on the downstream side of the sheet discharge outlet with a level difference, and a brake section of a sheet carried out at the sheet discharge outlet, wherein the brake section includes a lever member in which its base end portion is axially supported by an attachment frame, and its front end portion moves up and down corresponding to a load amount of sheets.

7 Claims, 4 Drawing Sheets

(51) Int. Cl.
*B65H 31/00* (2006.01)
*B65H 29/52* (2006.01)
*B65H 31/02* (2006.01)

(52) U.S. Cl.
CPC ...... *B65H 2511/20* (2013.01); *B65H 2515/10* (2013.01); *B65H 2801/39* (2013.01)

Prior Art

MECHANISM FOR DISCHARGING SHEETS IN APPARATUS FOR PROCESSING SHEETS AND APPARATUS FOR READING IMAGES PROVIDED WITH THE MECHANISM

TECHNICAL FIELD

The present invention relates to improvements in a sheet discharge mechanism for storing sheets processed in an image reading apparatus or the like in a sheet discharge tray.

BACKGROUND ART

Generally, sheets fed from a processing section such as an image reading section are carried out to a sheet discharge tray disposed on the downstream side of a sheet discharge path, loaded, and stored. Therefore, a sheet discharge roller is disposed in a sheet discharge outlet of the sheet discharge path to carry out a sheet toward above the tray. A sheet discharge mechanism is known in which the sheet discharge tray is disposed on the downstream side of the sheet discharge outlet with a level difference formed to load and store carried-out sheets.

For example, in Patent Document 1, a sheet is fed from a paper feed tray disposed vertically to an image reading section, and is stored in a sheet discharge tray disposed below the reading section. At this point, using a stopper member suspended downwardly from above in front of the sheet discharge outlet, the sheet is prevented from being scattered on the tray.

PRIOR ART DOCUMENT

Patent Document

[Patent Document 1] Japanese Patent Application Publication No. 2014-22840

DISCLOSURE OF INVENTION

Problems to be Solved by the Invention

In carrying out a sheet onto the sheet discharge tray vigorously from the sheet discharge outlet as described above, a mechanism is adopted in which a brake section (brake lever or the like) for reducing a carrying-out velocity of the sheet is disposed above the tray.

Conventionally, a lever-shaped brake member (brake member described in Patent Document 1 or the like) has been provided downwardly from above the sheet discharge tray to suppress a velocity of a sheet carried out of the sheet discharge outlet. In this case, it is required that a sheet fed from the sheet discharge outlet is always collected in a predetermined position on the tray when (1) the sheet discharge velocity differs according to a reading image mode (monochrome, color and the like), (2) the sheet size differs to be large and small, (3) the sheet thickness and/or material differs, and (4) a sheet property such as curl differs.

For example, in carrying out a sheet with thin materials of a large size from the sheet discharge outlet at a high velocity, as shown in FIG. 4B, when the sheet front end strikes a brake lever and is guided in an entangled direction, the sheet curls and causes a jam.

Accordingly, conventionally, materials and size of sheets to use have been determined in predetermined ranges to set action of the brake lever. Therefore, there has been a problem that a user does not execute processing such as image reading when the user uses a particular sheet.

It is an object of the present invention to provide a sheet discharge mechanism for enabling a wide range of sheets to be neatly stored on a sheet discharge tray from a processing section such as image reading with simplified structure.

Means for Solving the Problem

In order to attain the object, in the present invention, a brake lever for reducing a velocity of a sheet fed from a sheet discharge outlet is held to be detachable and attachable with respect to an attachment frame above a sheet discharge tray, and it is made possible to select whether or not to work brake action corresponding to sheet discharge conditions.

The invention is a sheet discharge mechanism for collecting a sheet fed from a processing section in a sheet discharge tray, and the mechanism is provided with a sheet discharge path having a sheet discharge outlet, a sheet discharge tray disposed on the downstream side of the sheet discharge outlet with a level difference formed, and a brake section of the sheet carried out of the sheet discharge outlet.

Then, the brake section is comprised of a lever member where a base end portion thereof is axially supported by an attachment frame swingably, and a front end portion thereof moves up and down corresponding to a load amount of sheets, and it is configured that the lever member is capable of being held by the attachment frame in a retract posture in which the front end portion is separated from a loaded sheet.

By this means, it is possible to hold the lever member in a position retracted to above the sheet from an operation posture for engaging in the sheet carried out of the sheet discharge outlet to brake, and it is possible to select brake action corresponding to sheet discharge conditions of the sheet.

In the invention, in the lever member and the attachment frame, a protrusion portion is formed in one of the lever member or the frame, a concave dent portion is formed in the other one, and the protrusion portion and the concave dent portion engage in each other by elasticity, and hold the lever member in the retract posture in which the front end portion is separated from a loaded sheet.

By this means, the lever member is capable of being held with simplified structure and easily leased with respect to the attachment frame.

In the invention, a plurality of rib-shaped protrusion portions is formed in the front end portion of the lever member, a concave dent portion fitted into the protrusion portions is provided in the attachment frame, and at this point, the concave dent portion is made an elastically deformable shape.

By this means, the lever member undergoes weight adjustment so that proper brake action works with a plurality of rib-shaped protrusion portions, and by concurrently enabling the concave dent portion on the frame side to cause elastic deformation, it is possible to reliably hold in a fit state.

In the invention, the lever member is provided with a knob for releasing engagement of the protrusion portion and the concave dent portion. By this means, it is possible to restore the lever member to the operation posture with ease.

In the invention, in the rib-shaped protrusion portions is integrally formed a collar portion, and this collar portion is used as the knob for releasing. By this means, its manufacturing is made ease.

In the invention, in one of the lever member or the attachment frame is formed an operation aperture for releasing engagement between the protrusion portion and the concave dent portion. By this means, it is possible to release the engagement between the protrusion portion and the concave dent portion from the operation aperture.

In the invention, the attachment frame is comprised of a paper feed tray disposed above the sheet discharge tray. By this means, it is possible to attach the lever member between trays arranged vertically.

The invention is to provide a reading platen, an image reading mechanism disposed in the reading platen, a feeder mechanism disposed on the upstream side of the reading platen, and a sheet discharge mechanism disposed on the downstream side of the reading platen. Then, the sheet discharge mechanism is configured as described above.

By this means, in the image reading apparatus provided with the reading platen, the image reading mechanism disposed in the reading platen, the feeder mechanism disposed on the upstream side of the reading platen, and the sheet discharge mechanism disposed on the downstream side of the reading platen, it is possible to select brake action corresponding to sheet discharge conditions of sheets, or the lever member undergoes weight adjustment so that proper brake action works with a plurality of rib-shaped protrusion portions.

Concurrently, by enabling the concave dent portion on the frame side to cause elastic deformation, it is possible to reliably hold in a fit state, or it is possible to restore the lever member to the operation posture with ease. Further, it is made ease manufacturing the knob for releasing the lever member, and it is also possible to release engagement of the protrusion portion and the concave dent portion from the operation aperture provided in the attachment frame. Accordingly, in the image reading apparatus, even when original document sheets are a wide range of sheets from thin paper to thick paper, it is possible to read successively with few jams.

Advantageous Effect of the Invention

The present invention is to provide the brake lever for reducing a sheet discharge velocity of a sheet above the sheet discharge tray, and position the lever selectively in the operation posture or non-operation posture, and therefore, has the following effects.

By selecting whether or not to work action of the brake lever corresponding to conditions of the size, materials, sheet discharge velocity and the like of a sheet fed from the sheet discharge outlet, any jam does not occur on the tray even in sheets of a wide range of sizes and materials, or weak curled sheets.

Further, the structure is configured with ease by providing the protrusion portion or concave dent portion in the attachment frame disposed above the tray, and locking the brake lever front end portion elastically.

BRIEF DESCRIPTION OF DRAWINGS

FIG. 3A illustrates an actuation posture and retract posture of an operation lever constituting a brake section, and FIGS. 3B and 3C illustrate different Embodiments for releasing engagement of a protrusion portion and a concave dent portion;

BEST MODE FOR CARRYING OUT THE INVENTION

Figure 1:
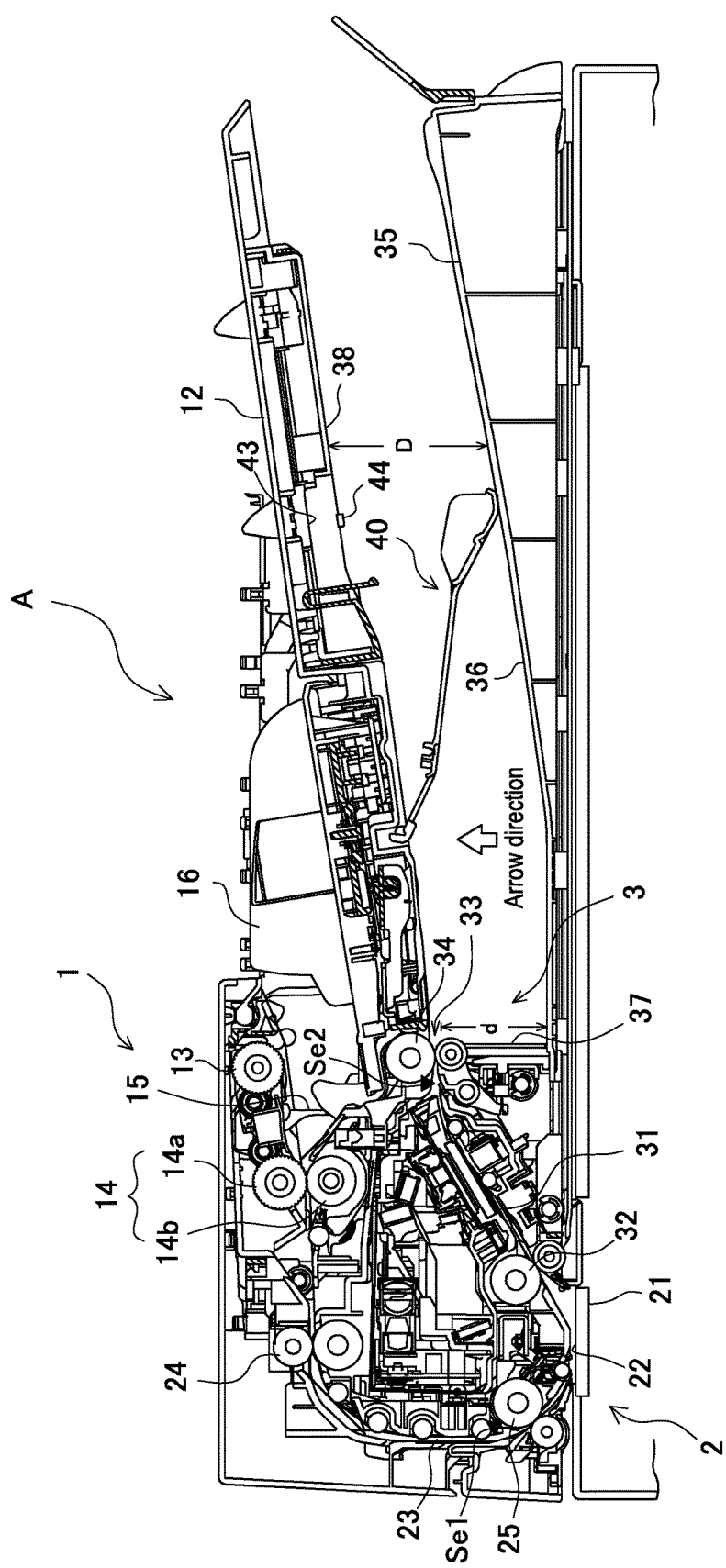
FIG. 1 is an explanatory view of the entire configuration of an image reading apparatus according to the present invention.

The present invention will specifically be described below based on Embodiments shown in drawings. FIG. 1 is an explanatory view of the entire configuration of an image reading apparatus A adopting the present invention. The apparatus shown in the figure is comprised of a paper feed section 1, reading section 2, and sheet discharge section 3.

The paper feed section 1 is comprised of a paper feed tray 12, kick roller 13, separation section 14, and gate stopper 15. The paper feed tray 12 is comprised of a tray to place original document sheets (hereinafter, referred to as "sheets"). The gate stopper 15 is disposed in a front end portion on the tray to facilitate setting of a bunch of sheets.

The kick roller 13 is comprised of a rotating body (roller, belt or the like) rotating in a paper feed direction so as to feed out sheets on the paper feed tray 12 in the paper feed direction, and is equipped with a shift mechanism (not shown) to move up and down between a position for engaging in the sheet and a retracted position. The separation section 14 separates sheets fed out by the kick roller on a sheet-by-sheet basis to send to the downstream side.

Therefore, the separation section 14 is comprised of a paper feed rotating body 14a such as a roller and belt that rotate in the paper feed direction, and a retard member 14b that inhibits the multi feed of sheets due to the rotation. As the retard member 14b are known a backward rotation roller that rotates in the direction opposite to the paper feed direction, fixed roller, separation pad and the like.

The paper feed tray 12 shown in the figure is formed by mold forming of a synthetic resin, and a side regulation member 16 is integrally formed to regulate sides of the sheet.

The reading section 2 is comprised of a reading platen 21, and paper feed path (sheet transport path) 23. The reading platen 21 is formed of a transparent reading surface 22, and an image reading mechanism not shown is provided inside. As the image reading mechanism are known a light source lamp for applying light to an original document on the platen and an imaging optical system for forming an image on a CCD line sensor using reflected light from an image. As the imaging optical system, a plurality of different mechanisms is known such as a reduction optical system and unmagnification optical system, and the present invention is capable of adopting both of the systems.

The paper feed path 23 is disposed on the downstream side of the separation section 14, and is comprised of a path for guiding a sheet fed from the separation section 14 to the reading platen 21. In the path are disposed a register roller pair 24 and lead roller 25, and the rollers are coupled to respective drive motors for enabling rotation in the paper feed direction. Further, in the vicinity of the lead roller 25 is disposed a sensor Se1 for detecting a sheet front end, and it is configured to calculate a reading start position (line) in the reading platen 21 on the downstream side from a rotation amount of the roller and a detection signal of the sensor.

The sheet discharge section 3 is comprised of a sheet discharge path 31 for receiving the sheet from the reading platen 21 to transport, and a paper discharge tray 35. In the sheet discharge path 31 are disposed a transport roller 32 for carrying out the sheet from the reading platen 21, and a sheet discharge roller 34 disposed in a path sheet discharge outlet 33, and the rollers are coupled to respective drive motors rotating in a sheet discharge direction. Then, in the path sheet discharge outlet 33 is disposed a sheet discharge sensor Se2 for detecting the sheet front end and rear end.

The sheet discharge tray 35 is comprised of a tray member having a load surface 36 of sheets disposed while forming a level difference d from the path sheet discharge outlet 33 of the sheet discharge path 31. The load surface 36 is inclined in a rising direction for rising gradually in the sheet discharge direction (rightward in FIG. 1). This inclination is to align the sheet read end on a rear end regulation surface 37 (a level difference wall between the path sheet discharge outlet 33 and the load surface 36; elevation surface). Accordingly, angles of the extent to which the sheet slides down under its own weight are suitable as the inclination angle of the load surface.

As shown in FIG. 1, the sheet discharge tray 35 is disposed below the paper feed tray 12, and both of the trays are disposed at a distance D away vertically. The distance D forms load space of discharged sheets. Then, a lever member 41 forming a brake section 40 is disposed on a bottom wall 38 (attachment frame; the same in the following description) of the paper feed tray 12.

In the lever member 41, a base end portion 41a is axially supported by the attachment frame 38 swingably with a support pin 41p, and a front end portion 41b (suspending a distance D) is formed in a paper contact piece for engaging in the uppermost sheet on the load surface 36.

The paper contact piece 41b of the lever member 41 is formed in a wide width to the extent of preventing damage to the sheet, and a protrusion portion 42 is formed on the rear side of the surface contacting the sheet. The protrusion portion 42 shown in the figure is comprised of a plurality of ribs 41r (r1 to r6) having gaps, and each rib is formed of an elastically deformable resin material. On the other hand, in the attachment frame 38 is formed a concave dent portion 43 fitted into the protrusion portion 42 (see FIG. 2).

The protrusion portion 42 acts as a weight when the paper contact piece 41b of the lever member 41 contacts the sheet discharged to the sheet discharge tray 35. It is also possible to change the thickness of the paper contact piece 41b to form, however, when the thickness is increased so as to increase the weight amount, a lot of time is required for the resin to be cooled and hardened in performing resin forming.

By determining the thickness of the rib 41r in an elastically deformable range, and determining the number and length of ribs 41r according to a weighing range of paper types to supply, it is possible to form an optimum weight without affecting resin forming conditions.

Figure 2:
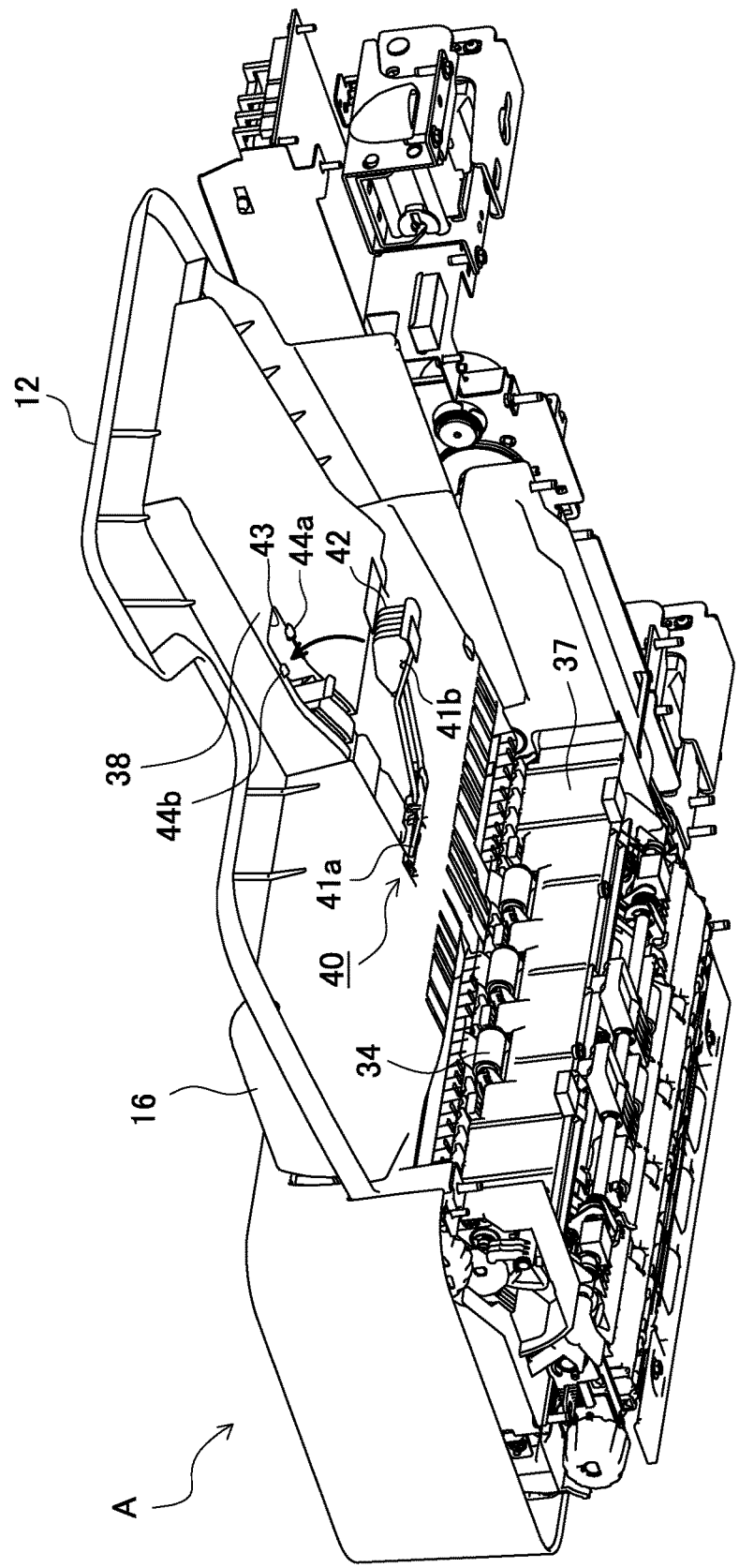
FIG. 2 is a partial explanatory view in the arrow direction in FIG. 1.

The relationship between the protrusion portion 42 and the concave dent portion 43 as described above will be described according to FIGS. 3A to 3C (enlarged view of principal part of FIG. 2). The protrusion portion 42 and the concave dent portion 43 are formed in positions and shapes for fitting into each other, one is disposed in the lever member 41, and the other one is disposed in the attachment frame 38. The case will be described where the protrusion portion 42 is disposed on the lever member side and the concave dent portion 43 is disposed on the attachment frame side as shown in the figure.

In the lever member 41, the protrusion portion 42 comprised of a plurality of ribs 41r (r1 to r6) having a width W1 is formed in the front end portion (paper contact piece) 41b.

On the other hand, the concave dent portion 43 having a width W2 is formed in the attachment frame 38, and the protrusion portion 42 and the concave dent portion 43 are disposed at the same distance from the support pin 41p of the lever member 41 as a center, and are arranged in positions that the protrusion portion 42 is fitted into the concave dent portion 43 when the lever member 41 performs swing motion.

In the concave dent portion 43 is formed a snap portion 44 (44a, 44b) for engaging in the protrusion portion 42 (r1, r6 on opposite sides). As the snap portion 44, in forming the attachment frame 38 with a synthetic resin, concurrently with cut formation of the concave dent portion 43, the elastically deformable protrusion portion is provided in a flange portion thereof. For example, when the portion is integrally formed by mold forming, the processing is easy.

Accordingly, when the protrusion portion 42 of the lever member 41 is fitted into the concave dent portion 43 of the attachment frame 38, and the snap portions 44a, 44b compress the rib-shaped protrusion portion, the lever member 41 is held in a state in which the front end portion (paper contact piece) 41b is fitted into the inside of the attachment frame 38 formed in the paper feed tray 12.

In addition, the Embodiment is shown in which both of the rib 41r of the protrusion portion 42 and the snap portion 44 (44a, 44b) of the concave dent portion 43 are elastically deformable, and it is a matter of course that one of the portions may be elastically deformable.

Figure 3A:
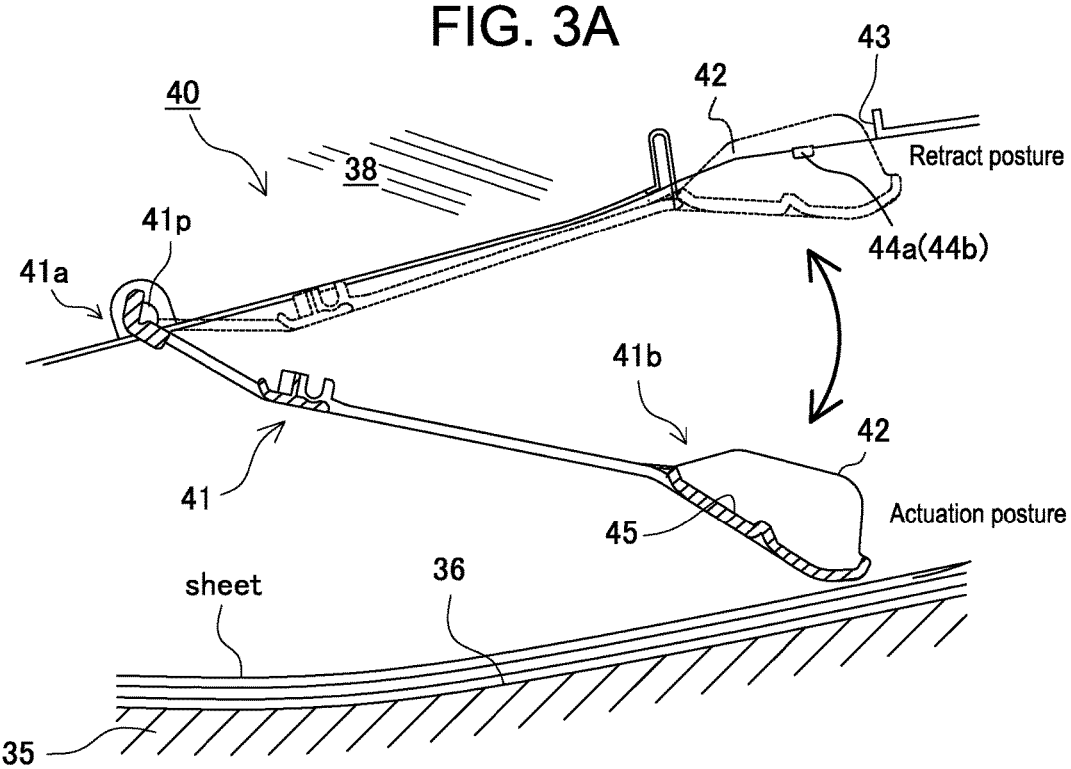
FIGS. 3A to 3C contain explanatory views of principal part of a sheet discharge mechanism according to the invention, where
Figure 3B:
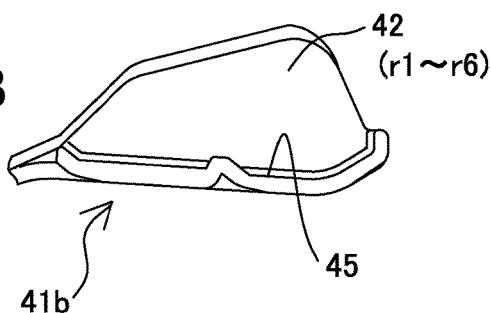

In the lever member 41, as shown in FIG. 3B, a collar portion (flange portion) 45 is integrally formed in the rib-shaped protrusion portion 42. By using the collar portion 45 as a knob, it is possible to release engagement of the protrusion portion 42 and the concave dent portion 43 that are mutually fitted.

Figure 3C:
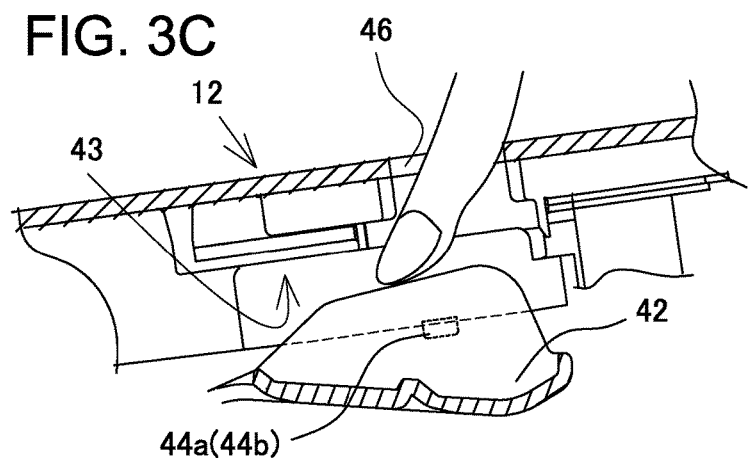
Figure 4A:
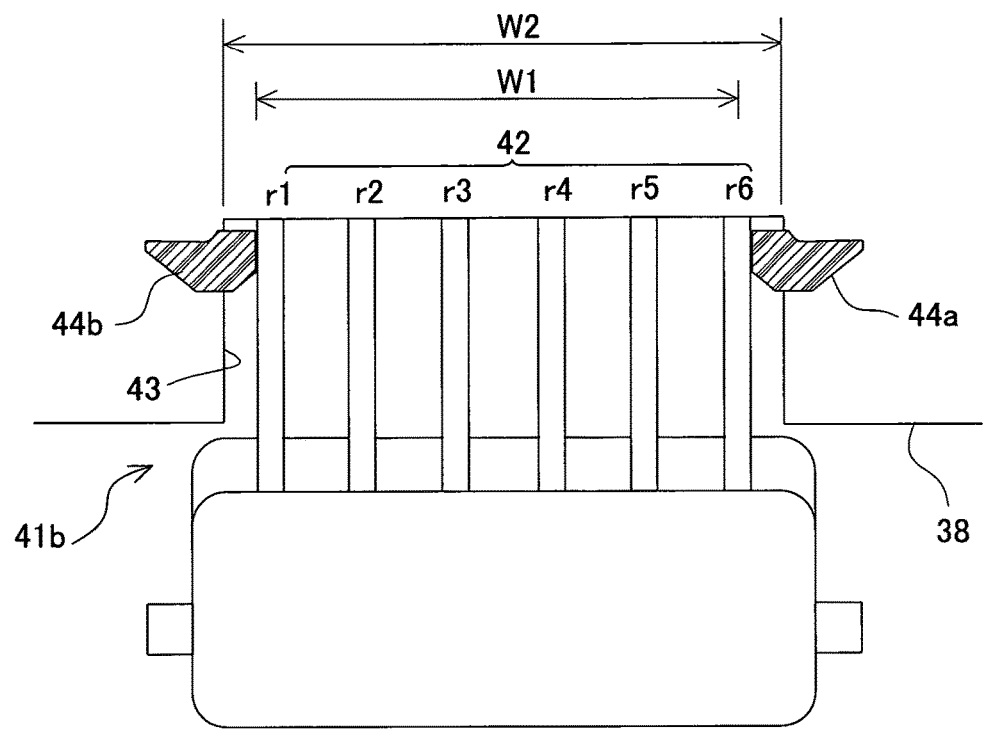
FIG. 4A illustrates a rib structure of the operation lever front end portion in the apparatus of FIG. 1.
Figure 4B:
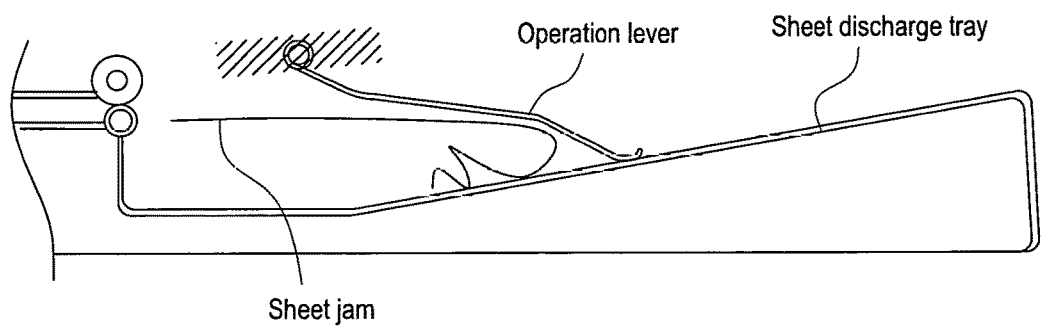
FIG. 4B is an explanatory view of a sheet discharge state in a conventional apparatus.

Further, as a substitute for the collar portion 45, as shown in FIG. 3C, it is also possible to release the engagement of the protrusion portion 42 and the concave dent portion 43, by providing an operation aperture 46 for enabling the fingers to be inserted from outside in one of the protrusion portion 42 and the concave dent portion 43.

An operation state of the brake section 40 will be described next. FIG. 3A illustrates an operation state of the brake section 40, and the solid line in FIG. 3A illustrates an actuation state of the brake section 40, while the dashed line illustrates a non-actuation state of the brake section 40. In the actuation state, the lever member 41 supported at the base end portion 41a by the support pin 41p swingably engages the front end portion 41b in the load surface 36 (on the uppermost sheet) of the sheet discharge tray 35 under its own weight.

In this state, in the lever member 41, while following the uppermost sheet on the load surface 36, the front end portion (paper contact piece) 41b moves up and down to a height position of the uppermost sheet. In this state, the sheet front end carried out of the path sheet discharge outlet 33 is guided to the load surface 36 along the lever member 41. At this point, the sheet is loaded on the tray gently, while being decelerated by engagement friction with the front end portion (paper contact piece) 41b of the lever member 41.

Then, when an operator locks the lever member 41 in the non-actuation state of the dashed line in FIG. 3A, the lever member 41 does not exist in the sheet discharge area positioned above the load surface 36. Therefore, when a sheet discharged at a low velocity or a weak sheet is transported from the path sheet discharge outlet 33, any sheet jam does not occur without reducing the sheet discharge velocity.

This application claims priority from Japanese Patent Application No. 2014-262019 filed on Dec. 25, 2014 in Japan incorporated herein by reference.

The invention claimed is:

1. A sheet discharge mechanism for collecting a sheet fed from a processing section in a sheet discharge tray in a sheet processing apparatus, comprising:
    a sheet discharge path having a sheet discharge outlet;
    a sheet discharge tray disposed on a downstream side of the sheet discharge outlet with a level difference formed; and
    a brake section for braking a sheet carried out of the sheet discharge outlet,
    wherein the brake section is comprised of a lever member where a base end portion thereof is axially supported by an attachment frame swing-ably, and a front end portion thereof moves up and down corresponding to a load amount of sheets mounted on the sheet discharge tray,
    a protrusion portion is formed in one of the front end portion of the lever member or the attachment frame, and a concave dent portion is formed in the other of the lever member or the attachment frame, and
    the protrusion portion and the concave dent portion are elastically engaged to each other, and configured to be held in the attachment frame in a retract position in which the front end portion is separated from a position to exert braking against a loaded sheet.

2. The sheet discharge mechanism in a sheet processing apparatus according to claim 1,
    wherein a plurality of rib-shaped protrusion portions is formed in the front end portion of the lever member, the concave dent portion fitted into the protrusion portions is provided in the attachment frame, and the concave dent portion is in an elastically deformable shape.

3. The sheet discharge mechanism in a sheet processing apparatus according to claim 2,
    wherein the lever member is provided with a knob for releasing engagement of the protrusion portion and the concave dent portion.

4. The sheet discharge mechanism in a sheet processing apparatus according to claim 3,
    wherein in the rib-shaped protrusion portions is integrally formed a collar portion, and the collar portion forms the knob.

5. The sheet discharge mechanism in a sheet processing apparatus according to claim 1,
    wherein in one of the lever member or the attachment frame is formed an operation aperture for releasing engagement of the protrusion portion and the concave dent portion.

6. The sheet discharge mechanism in a sheet processing apparatus according to claim 1, wherein the attachment frame is a paper feed tray disposed above the sheet discharge tray.

7. An image reading apparatus comprising:
    a reading platen;
    an image reading mechanism disposed in the reading platen;
    a feeder mechanism disposed on an upstream side of the reading platen; and
    a sheet discharge mechanism disposed on a downstream side of the reading platen,
    wherein the sheet discharge mechanism is the sheet discharge mechanism according to claim 1.

* * * * *